(12) United States Patent
Afrasiabi et al.

(10) Patent No.: US 12,347,109 B2
(45) Date of Patent: Jul. 1, 2025

(54) AUTONOMOUS IMAGE ACQUISITION SYSTEMS FOR PRODUCTION AND ENVIRONMENT MONITORING AND EVENT DETECTION

(71) Applicant: THE BOEING COMPANY, Chicago, IL (US)

(72) Inventors: Amir Afrasiabi, University Place, WA (US); Nick S. Evans, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 418 days.

(21) Appl. No.: 17/722,060

(22) Filed: Apr. 15, 2022

(65) Prior Publication Data
US 2023/0334671 A1 Oct. 19, 2023

(51) Int. Cl.
*G06T 7/11* (2017.01)
*G05B 19/418* (2006.01)
*G06T 7/00* (2017.01)

(52) U.S. Cl.
CPC .......... *G06T 7/11* (2017.01); *G05B 19/41895* (2013.01); *G06T 7/0004* (2013.01); *G06T 2210/12* (2013.01)

(58) Field of Classification Search
CPC ............................................. G05B 19/41895
See application file for complete search history.

(56) References Cited

U.S. PATENT DOCUMENTS

| 9,377,778 | B2 | 6/2016 | Crothers | |
| 2017/0200293 | A1* | 7/2017 | Solem | G06F 16/444 |
| 2019/0364206 | A1 | 11/2019 | Dal Mutto et al. | |
| 2020/0370933 | A1* | 11/2020 | Ketterer | G01B 11/04 |
| 2021/0081701 | A1* | 3/2021 | Sirat | G01B 11/2408 |
| 2021/0097668 | A1* | 4/2021 | Pollock | G06T 7/344 |
| 2021/0334948 | A1* | 10/2021 | Pérez Soler | G06T 7/001 |

OTHER PUBLICATIONS

Jonnalagadda et al, "Viewpoint Selection for Object Reconstruction Using Only Local Geometric Features", Sep. 2003, IEEE, pp. 2116-2122 (Year: 2003).*

(Continued)

*Primary Examiner* — Edward Park
(74) *Attorney, Agent, or Firm* — Alleman Hall & Tuttle LLP

(57) ABSTRACT

Certain aspects of the present disclosure provide techniques for autonomous image acquisition. This includes determining a plurality of two-dimensional image perspectives for a plurality of image capture devices, and comparing the plurality of two-dimensional image perspectives with a generated two-dimensional representation of a target object, where the two-dimensional representation is generated based on a three-dimensional model of the target object. This further includes automatically moving at least one of the plurality of image capture devices, based on the comparing, to increase a portion of the target object captured by the plurality of image capture devices.

20 Claims, 12 Drawing Sheets

(56) References Cited

OTHER PUBLICATIONS

Jonnalagadda K et al., "Viewpoint selection for object reconstruction using only local geometric features," Proceedings / 2003 IEEE International Conference on Robotics and Automation: Sep. 14-19, 2003, vol. 2, Dated: Sep. 14, 2003, pp. 2116-2122 [Abstract Only].
Chen Shengyong et al., "Active vision in robotic systems: a survey of recent developments," The International Journal of Robtics Research, vol. 30, No. 11, Dated: Aug. 22, 2011, pp. 1343-1377 [Abstract Only].
Xinyi Fan et al., "Automated view and path planning for scalable multi-object 3D scanning," ACM Transactions on Graphics, ACM, vol. 35, No. 6, dated: Nov. 11, 2016.
Callieri M et al., "RoboScan: an automatic system for accurate an unattended 3D scanning," 3D Data Processing, Visualization and Transmission, 2004. Dated: Sep. 6, 2004, pp. 805-812.
European Patent Office, extended European Search Report for 23162252.3-1210 dated Feb. 10, 2023.

\* cited by examiner

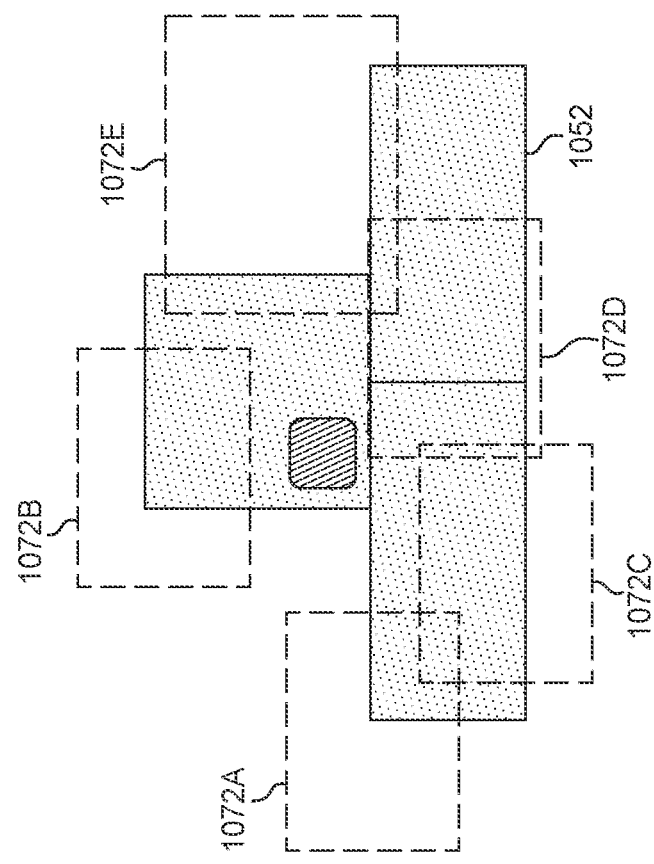
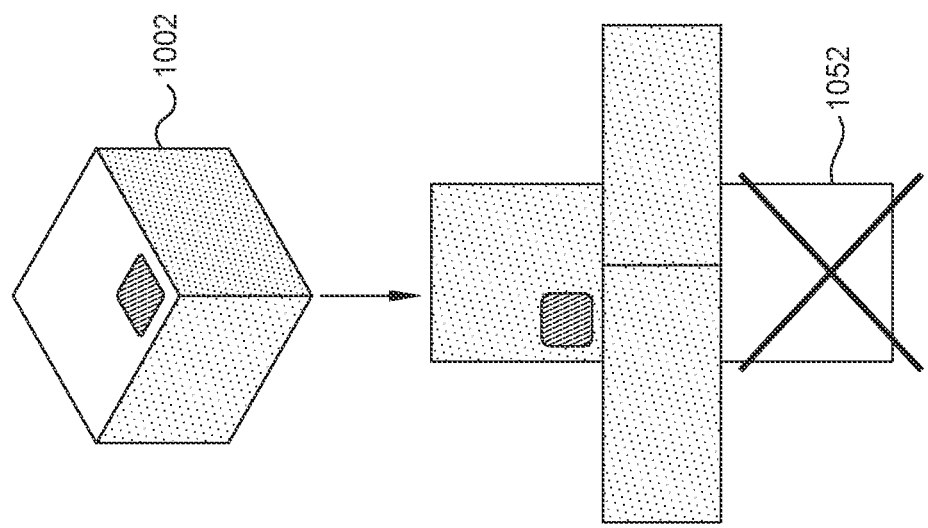
FIG. 10B

AUTONOMOUS IMAGE ACQUISITION SYSTEMS FOR PRODUCTION AND ENVIRONMENT MONITORING AND EVENT DETECTION

INTRODUCTION

Aspects of the present disclosure relate to autonomous image acquisition, and more specifically to autonomous image acquisition systems for production and environment monitoring and event detection.

Monitoring manufacturing facilities is a challenging problem. Many manufacturing facilities rely on visual data collected from cameras to monitor production, and to identify any problems or issues that occur. For example, visual data of production can be collected in a time-series manner, or reviewed in real-time, and can be used to detect events, monitor logistics and parts, and monitor safety.

Many existing systems, however, miss data points because not all objects and views are visible to the cameras at a given time. Further, many existing systems rely on manual calibration of cameras and identification of camera placement and views. And existing systems require extensive calibrations and localization activities to relate images captured from different cameras together. This is extremely difficult, and expensive in terms of computation and labor, given the complexity of modern manufacturing facilities with multiple static and dynamic objects.

BRIEF SUMMARY

Embodiments include a method. The method includes determining a plurality of two-dimensional image perspectives for a plurality of image capture devices. The method further includes comparing the plurality of two-dimensional image perspectives with a generated two-dimensional representation of a target object, where the two-dimensional representation is generated based on a three-dimensional model of the target object. The method further includes automatically moving at least one of the plurality of image capture devices, based on the comparing, to increase a portion of the target object captured by the plurality of image capture devices.

Embodiments further include a non-transitory computer-readable medium containing computer program code that, when executed by operation of one or more computer processors, performs operations. The operations include determining a plurality of two-dimensional image perspectives for a plurality of image capture devices. The operations further include comparing the plurality of two-dimensional image perspectives with a generated two-dimensional representation of a target object, where the two-dimensional representation is generated based on a three-dimensional model of the target object. The operations further include automatically moving at least one of the plurality of image capture devices, based on the comparing, to increase a 2D image coverage portion of the target object captured by the plurality of image capture devices.

Embodiments further include a system, including a computer processor and a memory having instructions stored thereon which, when executed on the computer processor, performs operations. The operations include determining a plurality of two-dimensional image perspectives for a plurality of image capture devices. The operations further include comparing the plurality of two-dimensional image perspectives with a generated two-dimensional representation of a target object, where the two-dimensional representation is generated based on a three-dimensional model of the target object. The operations further include automatically moving at least one of the plurality of image capture devices, based on the comparing, to increase a 2D image coverage portion of the target object captured by the plurality of image capture devices.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 10B further illustrates processing three-dimensional images for autonomous image acquisition for production and environment monitoring and event detection, according to one embodiment.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
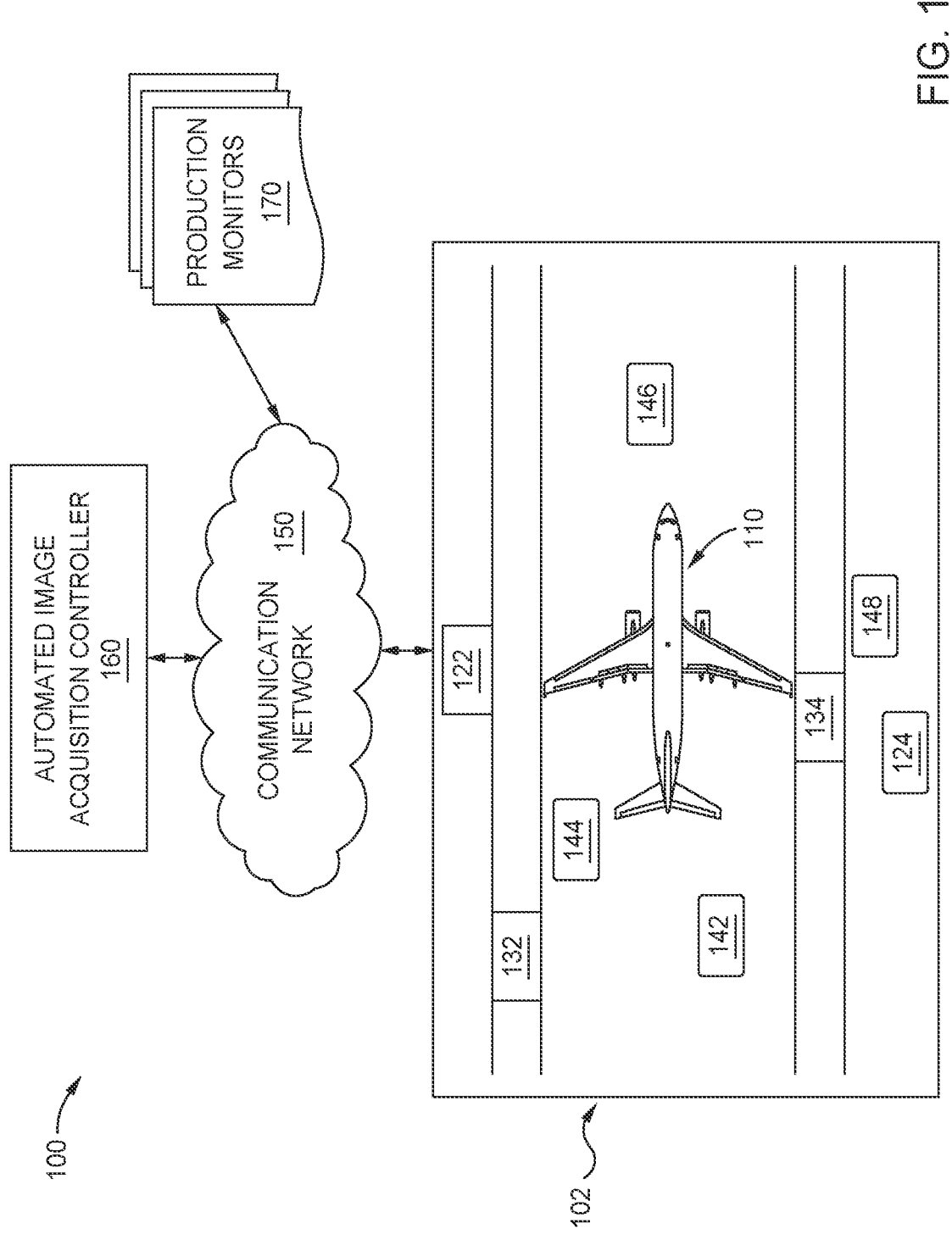
FIG. 1 illustrates a manufacturing production environment with autonomous image acquisition systems for production and environment monitoring and event detection, according to one embodiment.

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

As used in the present application, the terms "automatic," "automation," "automated," and "automating" refer to systems and processes that do not require the participation of a human user, such as a human system administrator. Although in some implementations a human may review the performance of the systems and methods disclosed herein, that human involvement is optional. Thus, the automatic processes described in the present application may be performed under the control of hardware processing components of the disclosed systems.

Embodiments of the present disclosure provide apparatuses, methods, processing systems, and computer-readable mediums for autonomous image acquisition systems for production and environment monitoring and event detection. In an embodiment, a collaborative system of systems can be used to provide temporal imaging results from various image acquisition sources. Example image acquisition sources include fixed pan-tilt-zoom (PTZ) cameras, dynamic PTZ cameras, crane two-dimensional (2D) plane traverser cameras (e.g., a HoistCam™ or another suitable camera), and automated guided vehicle (AGV) mounted cameras. These are merely examples, and any suitable cameras or other image capture devices can be used. Further, the image capture devices can capture the visible spectrum, the infrared spectrum, or any other suitable light spectrum, sound spectrum, or other suitable data.

In an embodiment, the image acquisition system includes an optimization layer to increase, or maximize, the total number of views, per object and per camera, at any given time. The optimization layer can interface with an AGV and crane movement scheduler and planner (e.g., to schedule and plan movement of AGV and crane mounted cameras), as well as a PTZ controller (e.g., to controller pan, tilt, and zoom on PTZ cameras). Further, the system can identify areas that lack visual coverage, and can predict areas that risk lacking visual coverage in the future (e.g., based on movement patterns and predictions). The system can route dynamic vehicles (e.g., AGV and crane mounted cameras) to appropriate locations to cover the areas lacking coverage.

In an embodiment, the system identifies, and predicts, areas lacking coverage by generating a 2D representation of three-dimensional (3D) objects in the environment. For example, the system can flatten views of 3D objects into a 2D pixel representation, and can calculate enclosing bounding boxes or semantically segmented regions representing the boundaries of the field of view (FOV) for each image capture device in the environment. The system can the compare the 2D pixel representation of the object with the calculated bounding boxes to identify areas lacking in coverage, or predicted to lack in coverage. The system can then move image capture devices (e.g., AGV mounted cameras, crane mounted cameras, and PTZ cameras) to improve, or maximize, coverage.

Further, in an embodiment, the image acquisition system includes an autonomous vehicle navigation layer to avoid collision and accidents. For example, the system can interact with AGV and crane controllers to navigate AGVs and cranes to avoid collisions with other vehicles, with personnel, and with other objects in the environment. The system can use deep learning, or other machine learning (ML) techniques, to distinguish static (e.g., unchanging or stationary) and dynamic (e.g., potentially changing or moving) objects in the environment to facilitate navigation.

One or more embodiments of the invention have numerous technical advantages. For example, some existing systems require manual control of image capture devices. This is inefficient, inaccurate, and expensive. One or more techniques described herein allow for autonomous image acquisition systems that provide for more complete and accurate coverage of production at a lower cost in terms of resources. More complete and accurate coverage results in improved manufacturing, safety, and quality control, by identifying any errors or issues.

As another example, one or more techniques described herein provide substantial savings in computational resources for ML model training. Typically, for applications of ML and Artificial Intelligence in computer vision, data scientists and developers need to provide diverse and large scale visual data for targeted objects. These tasks are currently time-consuming and impractical due to lack of view-angle diversity, perspective diversity, and image acquisitions from real objects. One or more techniques described herein provide ML developers and data scientists with visual representations (e.g., captured images) from different views and angles of objects (e.g., an object being manufactured) which will result in more accurate and robust trained models for object detection, scene recognition, object tracking, and quality inspections. Further, use of a feedback loop can ensure subsequent physical data collection will be minimized, reducing the need for additional data gathering. These visual representations could be used to provide training data for a wide variety of ML models.

As another, example, one or more techniques described herein increase computational efficiency by avoiding the use of unnecessary or redundant image capture devices. Some existing systems increase image capture coverage for production by increasing the number of image capture devices used to monitor production. However, this results in using redundant or unnecessary image capture devices, compared to one or more improved techniques described herein, which is wasteful and expensive. For example, using unnecessary image capture devices is wasteful because it requires the purchase and configuration of unnecessary devices, which is expensive, time consuming, and wastes power and other resources (e.g., network bandwidth for network connected devices). As another example, using unnecessary image capture devices wastes significant computational resources. Each image capture device captures data about the production. This data is typically processed, analyzed, and stored. Creating unnecessary data through unnecessary image capture wastes significant computational resources (and power and other resources) in processing, and wastes memory used for storage. One or more techniques described herein, by contrast, minimize the number of image capture devices used while maximizing coverage from those devices. This reduces the number of image capture devices used, which both limits resources need to purchase and configure the devices reduces the computational resources need to process and analyze data from the devices.

Example Systems and Methods

FIG. 1 illustrates a manufacturing production environment 100 with autonomous image acquisition systems for production and environment monitoring and event detection, according to one embodiment. In an embodiment, the environment 100 includes a facility 102. As illustrated, the facility 102 is a manufacturing facility used to manufacture an object 110 (e.g., an airplane). This is merely an example, and the facility 102 can be any suitable facility (e.g., a distribution facility, a warehouse facility, or any other suitable facility). Further, the object 110 can be any suitable object, or collection of objects.

In an embodiment, the facility 102 includes numerous image capture devices to capture manufacture of the object 110. For example, the facility 102 can include PTZ cameras 122 and 124 (e.g., image capture devices). As discussed above, the PTZ cameras 122 and 124 can be stationary PTZ cameras (e.g., stationary other than pan, tilt, and zoom) or moveable PTZ cameras. The facility 102 can further includes two crane cameras 132 and 134 (e.g., image capture devices). As discussed above, the crane cameras 132 and 134 can include crane devices with cameras attached. For example, the crane cameras 132 and 134 can be two-dimensional (2D) plane traverser cameras attached to cranes (e.g., a HoistCam™ or another suitable camera). These cameras can be placed at a designated height (e.g., using a crane) and then can move across a plane, at the designated height (e.g., with five degrees of freedom).

The facility 102 can further include AGV cameras 142, 144, 146, and 148 (e.g., image capture devices). For example, the AGV cameras 142, 144, 146, and 148 can be attached to any suitable AGV, including a drone, a wheeled vehicle, or any other suitable vehicle. In an embodiment, the AGV cameras 142, 144, 146, and 148 can move with six degrees of freedom. These are merely examples, and the facility 102 can include any suitable number, and type, of image capture devices. For example, one or more of the AGV cameras 142, 144, 146, or 148 can be cameras mounted to manually guided vehicles. In an embodiment, an operator for the manually guided vehicle can be provided with instructions (e.g., a waypoint or other suitable instruction) to move the vehicle to a preferred location.

In an embodiment, the image capture devices 122, 124, 132, 134, 142, 144, 146, and 148 are used to capture visual data (e.g., still and video images) of manufacture of the object 110 in the facility 102. As noted above, capturing visual data is merely an example, and one or more of the image capture devices 122, 124, 132, 134, 142, 144, 146, and 148 could include sound capture, or any other data capture, in addition to (or instead of) visual data capture. This visual data can be transmitted to production monitors 170 using a communication network 150. For example, the production monitors 170 can include repositories to store the visual data, software services to analyze and process the visual data, and personnel to review the visual data. The visual data can be streamed (e.g., in real-time or near real-time) from the facility 102 to the production monitors 170. Further, the visual data can be recorded in a suitable electronic repository (e.g., an electronic database, a cloud storage repository, an on-site storage repository, or any other suitable repository).

In an embodiment, an automated image acquisition controller 160 controls image acquisition for the facility 102 through the communication network 150. This is discussed further below, with regard to FIG. 2. For example, the automated image acquisition controller 160 can map the environment of the facility 102, acquire images of the facility 102, navigate image capture devices in the facility 102 (e.g., the crane cameras 132 and 134 and the AGV cameras 142, 144, 146, and 148), and determine pixel coverage for the image capture devices in the facility 102 (e.g., by converting 3D representations of the object 110 into a 2D representation).

In an embodiment, the communication network 150 can be any suitable communication network, including a local area network (LAN), a wide area network (WAN), the Internet, or any other suitable communication network. Further, the facility 102, the production monitors 170, the automated image acquisition controller 160, and any other devices in the environment 100, can be connected to the communication network using any suitable network connection, including a wired connection (e.g., an Ethernet or fiber optic connection), a wireless connection (e.g., a WiFi connection), a cellular connection, or any other suitable network connection.

As illustrated, in an embodiment, the automated image acquisition controller 160 and the production monitors 170 communicate with the facility 102 using the communication network 150. This is merely an example. In an embodiment, any, or all, components of the automated image acquisition controller 160 and the production monitors 170 can be located on-site at the facility 102 and can communicate with devices in the facility 102 using any suitable technique.

Figure 2:
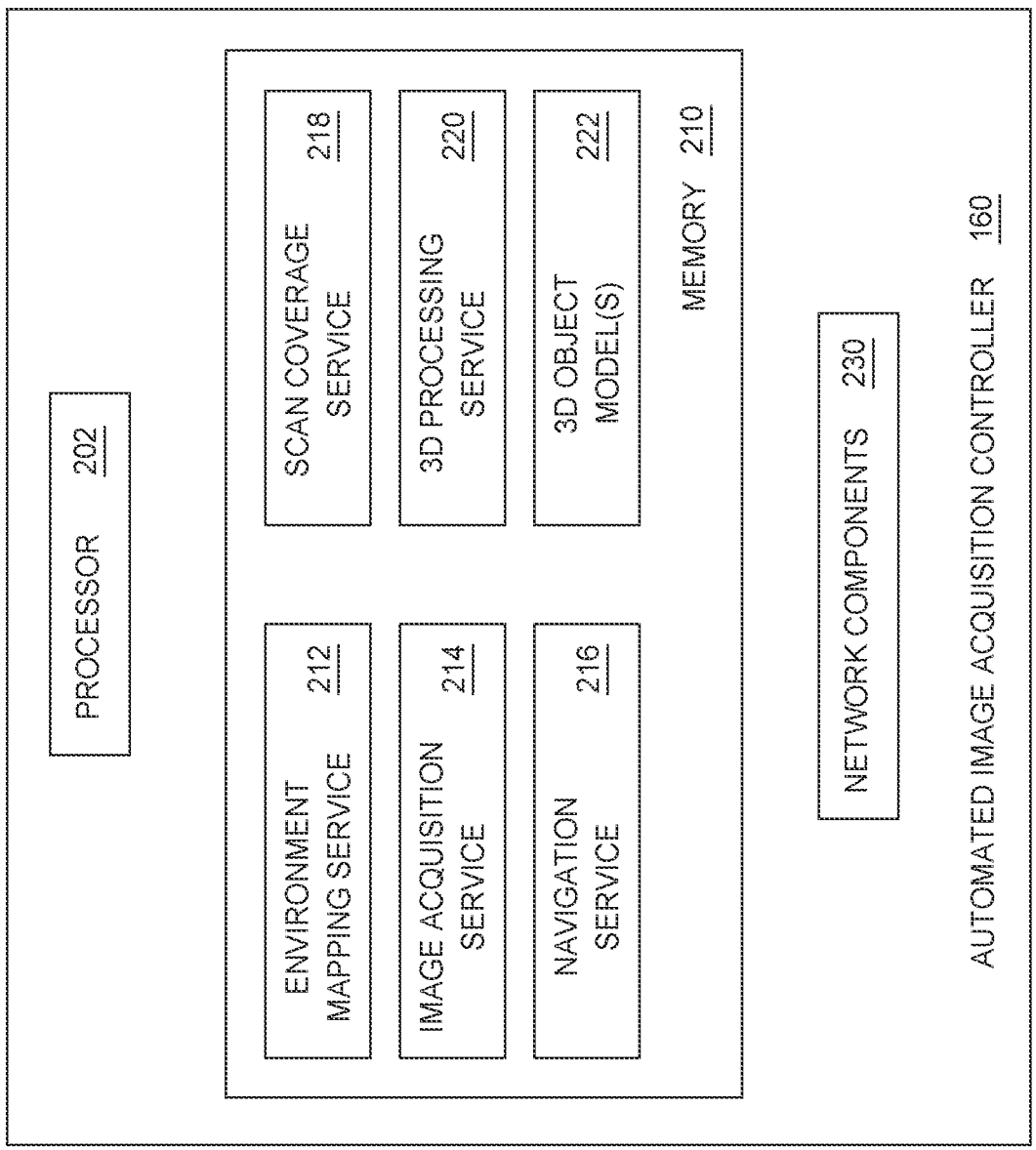
FIG. 2 is a block diagram illustrating an automated image acquisition controller for autonomous image acquisition for production and environment monitoring and event detection, according to one embodiment.

FIG. 2 is a block diagram illustrating an automated image acquisition controller 160 for autonomous image acquisition for production and environment monitoring and event detection, according to one embodiment. An automated image acquisition controller 160 includes a processor 202, a memory 210, and network components 230. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 230 include the components necessary for the automated image acquisition controller 160 to interface with a suitable communication network (e.g., the communication network 150 illustrated in FIG. 1). For example, the network components 230 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the automated image acquisition controller 160. The program code is generally described as various functional "applications" or "modules" within the memory 210, although alternate implementations may have different functions and/or combinations of functions. Within the memory 210, an environment mapping service 212 facilitates mapping the environment of a facility (e.g., the manufacturing facility 102 illustrated in FIG. 1). This is discussed further below with regard to FIGS. 5 and 6. An image acquisition service 214 facilitates controlling image acquisition for a facility (e.g., the manufacturing facility 102 illustrated in FIG. 1). This is discussed further below with regard to FIGS. 5 and 7. A navigation service 216 facilitates navigating image capture devices (e.g., the crane cameras 132 and 134 and AGV cameras 142, 144, 146, and 148 illustrated in FIG. 1). This is discussed further below with regard to FIGS. 5 and 8. A scan coverage service 218 facilitates determining pixel coverage by image capture devices for a facility (e.g., the manufacturing facility 102 illustrated in FIG. 1). This is discussed further below with regard to FIGS. 5 and 9. A 3D processing service 220 facilitates converting a 3D representation of an object (e.g., the object 110 illustrated in FIG. 1) to a 2D representation. This is discussed further below with regard to FIGS. 5 and 10A-B. For example, the 3D processing service 220 can convert one or more 3D object models 222 to a 2D representation.

Although FIG. 2 depicts the services 212, 214, 216, 218, and 220, and the 3D object model(s) 222, as being located in the memory 210, that representation is also merely provided as an illustration for clarity. More generally, the controller 160 may include one or more computing platforms, such as computer servers for example, which may be co-located, or may form an interactively linked but distributed system, such as a cloud-based system. As a result, the processor 202 and the memory 210 may correspond to distributed processor and memory resources within the environment 100 illustrated in FIG. 1. Thus, it is to be understood that any, or all, of the services 212, 214, 216, 218, and 220, and the 3D object model(s) 222, may be stored remotely from one another within the distributed memory resources of the environment 100.

Figure 3:
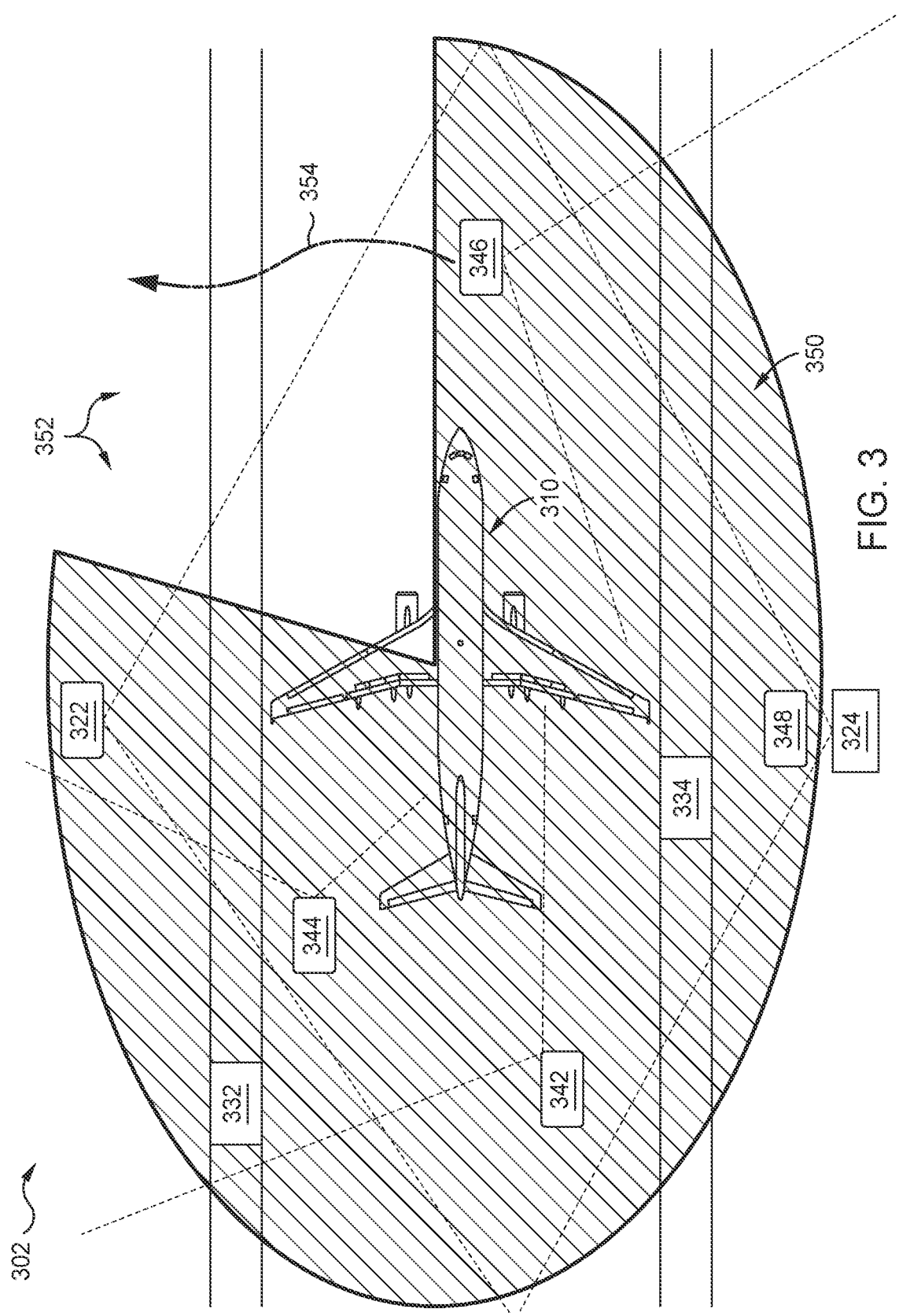
FIG. 3 illustrates image capture device fields of view for autonomous image acquisition for production and environment monitoring and event detection, according to one embodiment.

FIG. 3 illustrates image capture device FOVs (e.g., two-dimensional image perspectives) for autonomous image acquisition for production and environment monitoring and event detection, according to one embodiment. In an embodiment, a manufacturing production facility 302 is used to manufacture an object 310 (e.g., an airplane). For example, the manufacturing production facility 302 can correspond to the facility 102 illustrated in FIG. 1, further illustrating two-dimensional image perspectives for the respective image capture devices. This is merely an example, and the facility can be any suitable facility (e.g., a distribution facility, a warehouse facility, or any other suitable facility). Further, the object 310 can be any suitable object, or collection of objects.

In an embodiment, as in FIG. 1, the facility 302 includes numerous image capture devices to capture visual data depicting manufacture of the object 310 (e.g., still and video images). For example, like the facility 102 illustrated in FIG. 1, the facility 302 can include PTZ cameras 322 and 324, crane cameras 332 and 334, and AGV cameras 342, 344, 346, and 348. In an embodiment, each of the cameras 322, 324, 332, 334, 342, 344, 346, and 348 includes a respective two-dimensional image perspective (e.g., FOV), illustrated by the example dashed lines for the cameras 322, 324, 342, 344, and 346. While the two-dimensional image perspective (e.g., FOV) is illustrated only for these cameras, for simplicity in illustration, in an embodiment each of the cameras 322, 324, 332, 334, 342, 344, 346, and 348 includes its own two-dimensional image perspective.

As illustrated in FIG. 3, the combined two-dimensional image perspectives for the cameras 322, 324, 332, 334, 342, 344, 346, and 348 covers a combined area 350. This area is sufficient to capture visual data for most of the object 310, but leaves a gap 352. In an embodiment, an automated image acquisition controller (e.g., the controller 160 illustrated in FIGS. 1 and 2) can identify this gap, and can modify the FOV for one or more of the cameras 322, 324, 332, 334, 342, 344, 346, and 348 to cover the gap (e.g., pan, tilt, zoom, or move a camera). For example, the controller can move the AGV camera 346 to cover the gap (e.g. as illustrated by the arrow 354). This is further illustrated in FIG. 4.

Figure 4:
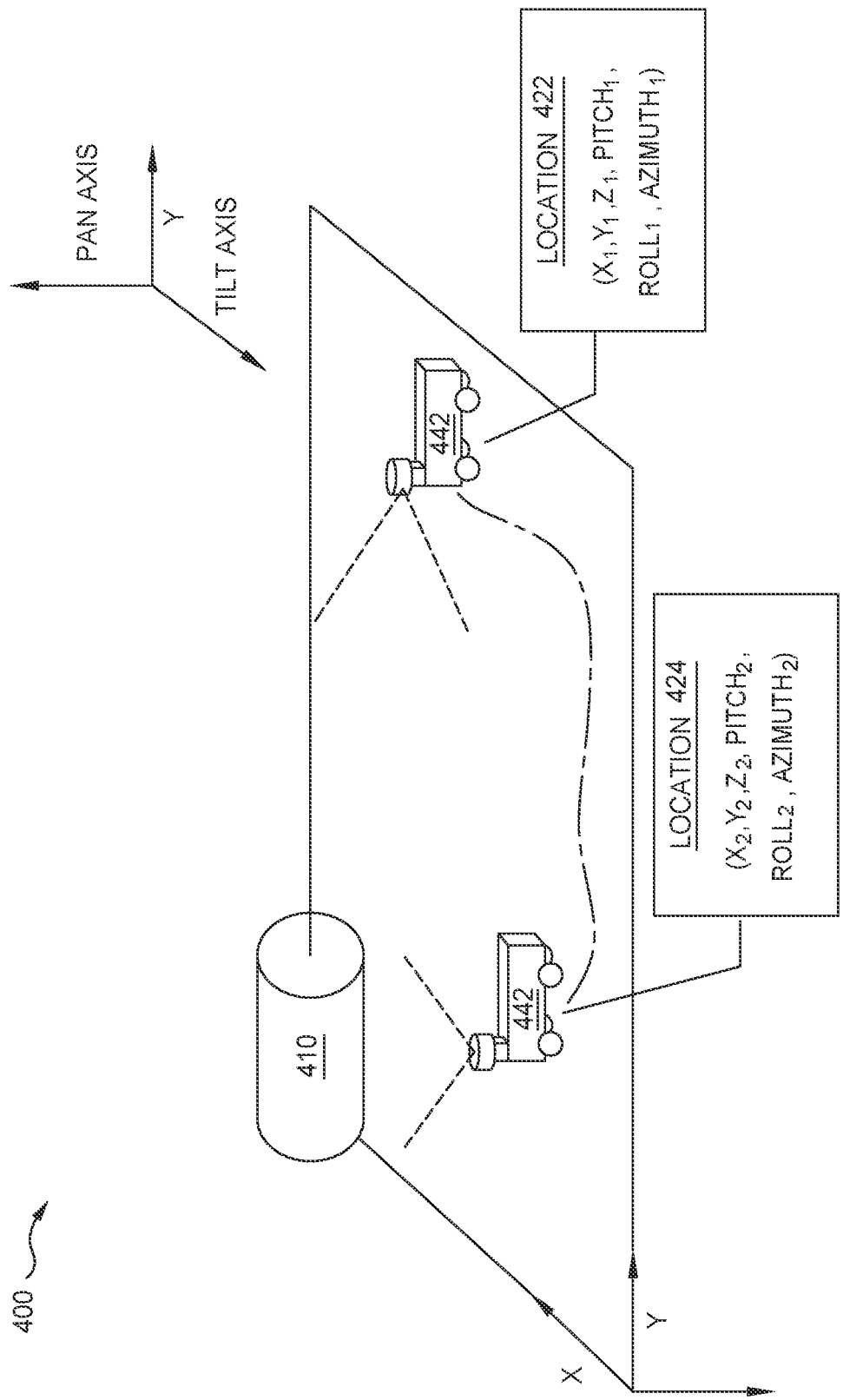
FIG. 4 illustrates movement of image capture devices for autonomous image acquisition for production and environment monitoring and event detection, according to one embodiment.

FIG. 4 illustrates movement of image capture devices for autonomous image acquisition for production and environment monitoring and event detection, according to one embodiment. In an embodiment, a production environment 400 (e.g., a manufacturing facility) is used to manufacture an object 410. An image capture device 442 is used to capture visual data reflecting the manufacture. For example, the image capture device 442 can be an AGV camera.

In an embodiment, the AGV camera 442 is initially at a location 422. While at the location 422 the AGV camera 442 has a location defined by the coordinates ($X_1$, $Y_2$, $Z_1$, $Pitch_1$, $Roll_1$, $Azimuth_1$). This location information can be used to derive location and configuration information for one or more sensors associated with the AGV camera 442, at the location 422. For example, the AGV camera can be associated with one or more cameras, thermal imaging sensors, hyperspectral sensors, LIDAR sensors, or any other suitable sensors. The location information can be used to derive pose information (e.g., pitch, roll, and azimuth) for the sensor(s) associated with the AGV camera 442. The location information can further be used to derive a two-dimensional image perspective (e.g., a FOV) for the sensor (e.g., based on an intrinsic matrix). In an embodiment, the AGV camera 442 captures visual data (e.g., still and video images or any other suitable data) of a front surface of the object 410, but does not capture visual data of a side surface of the object 410 because of the position of the AGV camera 442.

Assume an automated image acquisition controller (e.g., the controller 160 illustrated in FIGS. 1 and 2) determines that insufficient visual data is currently being captured of the side of the object 410, or is predicted to be captured in the future. This is discussed further below with regard to FIGS. 1-11. The controller can control the AGV camera 442 to move from the location 422 to a location 424. At the location 424, the AGV camera 442 has a location defined by the coordinates ($X_2$, $Y_2$, $Z_2$, $Pitch_2$, $Roll_2$, $Azimuth_2$). This new location information can be used to derive location and configuration information for one or more sensors associated with the AGV camera 442, at the location 424. For example, the new location information can be used to derive new pose information (e.g., pitch, roll, and azimuth) for the sensor(s) associated with the AGV camera 442. The new location information can further be used to derive a two-dimensional image perspective (e.g., a FOV) or the sensor (e.g., based on an intrinsic matrix). In an embodiment, placement at the location 424 allows the AGV camera 442 to capture visual data of the side surface of the object 410 (e.g., to fill in a gap in visual data coverage).

Figure 5:
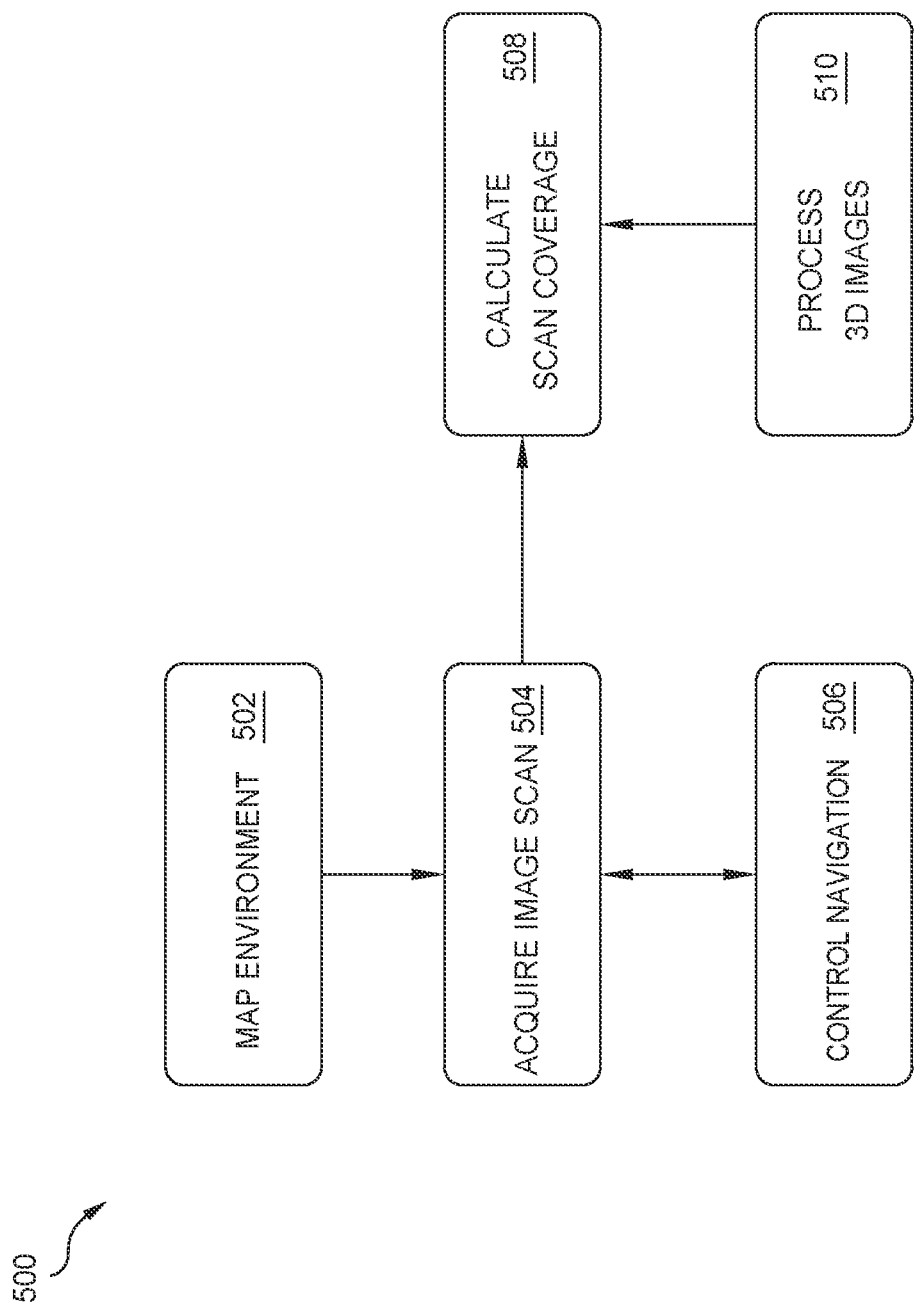
FIG. 5 is a flowchart illustrating autonomous image acquisition for production and environment monitoring and event detection, according to one embodiment.

FIG. 5 is a flowchart 500 illustrating autonomous image acquisition for production and environment monitoring and event detection, according to one embodiment. In an embodiment, at block 502 an environment mapping service (e.g., the environment mapping service 212 illustrated in FIG. 2) maps the environment. For example, the environment mapping service can segment static and dynamic objects (e.g., using a suitable ML model), can identify initial camera locations, and can generate a network graph representation of objects in the environment. This is discussed further below, with regard to FIG. 6.

In an embodiment, at block 504 an image acquisition service (e.g., the image acquisition service 214 illustrated in FIG. 2) acquires image scans of the environment (e.g., still and video images or other sensor data) using the environment mapping. For example, the image acquisition service can identify available cameras (e.g., moving cameras, fixed cameras, crane cameras, and any other suitable cameras) or other sensor devices, and movement possibilities (e.g., available DOF for the cameras), and can analyze captured images and the environment mapping to trigger movement of cameras and capture pixels (or movement of other sensors can capture of corresponding data) reflecting the images of the environment. This is discussed further below, with regard to FIG. 7.

In an embodiment, at block 506 a navigation service (e.g., the navigation service 216 illustrated in FIG. 2) navigates image capture devices (e.g., cameras) using instructions or other information from the image acquisition service. For example, the navigation service can identify the available cameras and available movements, and can control movement of the cameras, over time, based on instructions from the image acquisition service. This is discussed further below, with regard to FIG. 8.

In an embodiment, at block 508 a scan coverage service (e.g., the scan coverage service 218 illustrated in FIG. 2) identifies current scan coverage by image capture devices, and predicted future scan coverage for the image capture devices, using data from the image acquisition service. For example, the scan coverage service can use data from the image capture service reflecting the scan coverage of current image capture devices (e.g., pixel coverage), along with data reflecting the object (e.g., a FOV pixel map) to be captured (e.g., from a 3D processing service) to determine current and predicted future pixel coverage. This is discussed further below, with regard to FIG. 9.

In an embodiment, at block 510 a 3D processing service (e.g., the 3D processing service 220 illustrated in FIG. 2) calculates a FOV pixel map for the object to be captured, and provides the pixel map to the scan coverage service. For example, the 3D processing service can generate flattened 2D representations of the objects to be captured, from 3D models of the objects, and can use the 2D representations to calculate FOV pixel map for the object. This is discussed further below, with regard to FIG. 10A-B.

Figure 6:
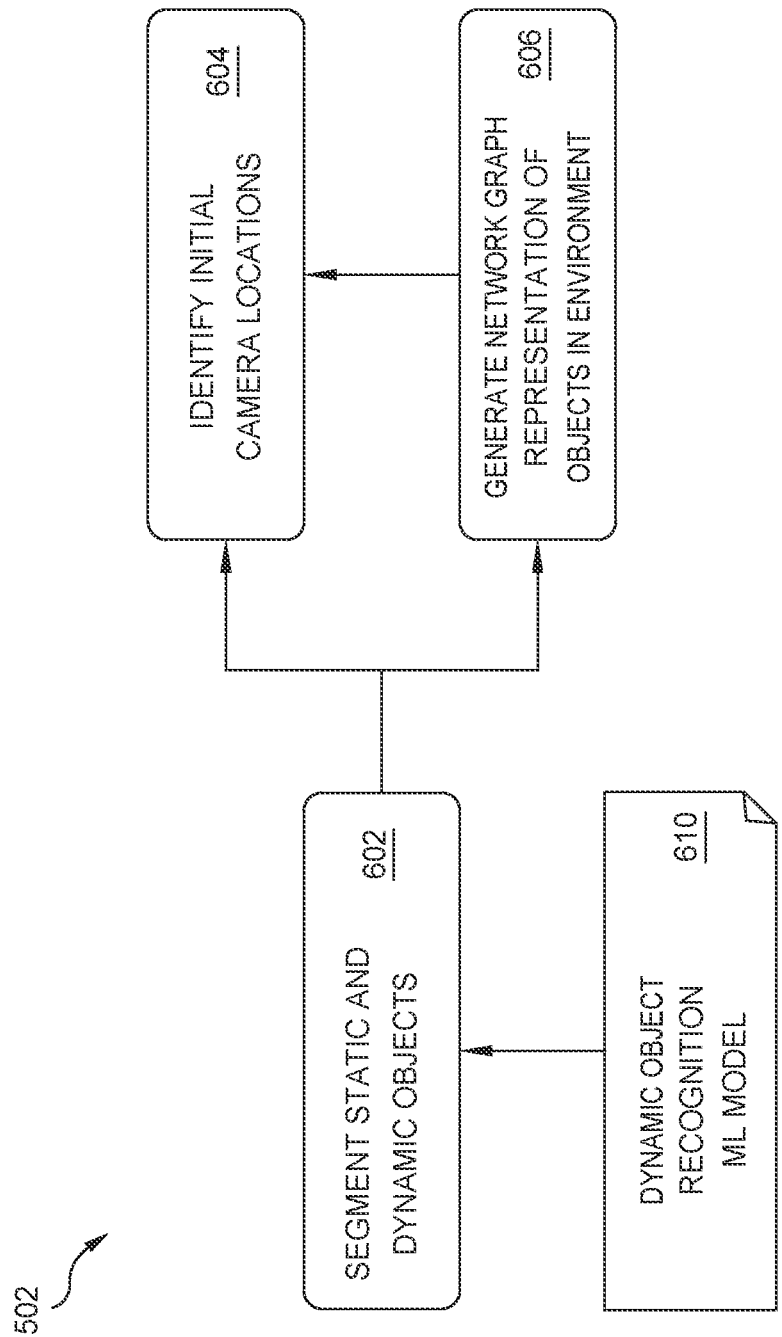
FIG. 6 is a flowchart illustrating mapping an environment for autonomous image acquisition for production and environment monitoring and event detection, according to one embodiment.

FIG. 6 is a flowchart illustrating mapping an environment for autonomous image acquisition for production and environment monitoring and event detection, according to one embodiment. In an embodiment, FIG. 6 corresponds with block 502 illustrated in FIG. 5. At block 602, an environment mapping service (e.g., the environment mapping service 212 illustrated in FIG. 2) segments static and dynamic objects. For example, the environment mapping service can use a dynamic object recognition ML model 610 to identify static (e.g., unchanging or stationary) and dynamic (e.g., potentially changing or moving) objects in the environment. The dynamic object recognition ML model 610 can be any suitable ML model, including a deep neural network (DNN) (e.g., a You Only Look Once (YOLO) model or another suitable convolutional neural network (CNN)), another suitable supervised ML model, an unsupervised ML model, or any other suitable ML model.

In an embodiment, the dynamic object recognition ML model 610 is a deep learning InPainting technique, in which dynamic objects are removed from each camera's two-dimensional image perspective (e.g., FOV) in the environment to create a simplified dynamic environment. In this embodiment, dynamic objects will be removed from the captured video data, for a given time frame, while static objects remain. This allows the environment mapping service to segment static and dynamic objects in the vide data.

At block 604, the environment mapping service identifies initial camera locations. For example, as illustrated in FIG. 1, the environment mapping service can identify the locations of the cameras 122, 124, 132, 134, 142, 144, 146, and 148, relative to the layout of the facility 102. In an embodiment, the locations can be represented using a tuple describing the 3D coordinates of the cameras, the pan, tilt, and zoom characteristics of the cameras, and other FOV characteristics of the cameras (e.g., the locations 422 and 424 illustrated in FIG. 4). This is merely an example, and the location can be represented using any suitable technique. The environment mapping service can identify these locations using any suitable technique, including data from the cameras themselves (e.g., electronics job data, radio frequency ID (RFID) data, global position system (GPS) data, or any other suitable location information), image recognition (e.g., based on analyzing images captured by the cameras), pre-determined camera locations (e.g., configured by an administrator), network location information (e.g., using transmissions from wireless radios (e.g., WiFi or cellular radios) associated with the cameras to identify the camera locations), or any other suitable technique.

At block 606, the environment mapping service generates a network graph representation of objects in the environment. For example, the environment mapping service can generate a network graph in which objects are nodes in the graph and distance vectors representing the distances between objects are edges in the graph. In an embodiment, the graph can update or change as dynamic objects in the graph move (e.g., the graph can update in real-time or near real-time as dynamic objects move). The environment mapping service can use any suitable technique to generate the network graph (e.g., based on the segmenting the static and dynamic objects at block 602, or using any other suitable technique).

Figure 7:
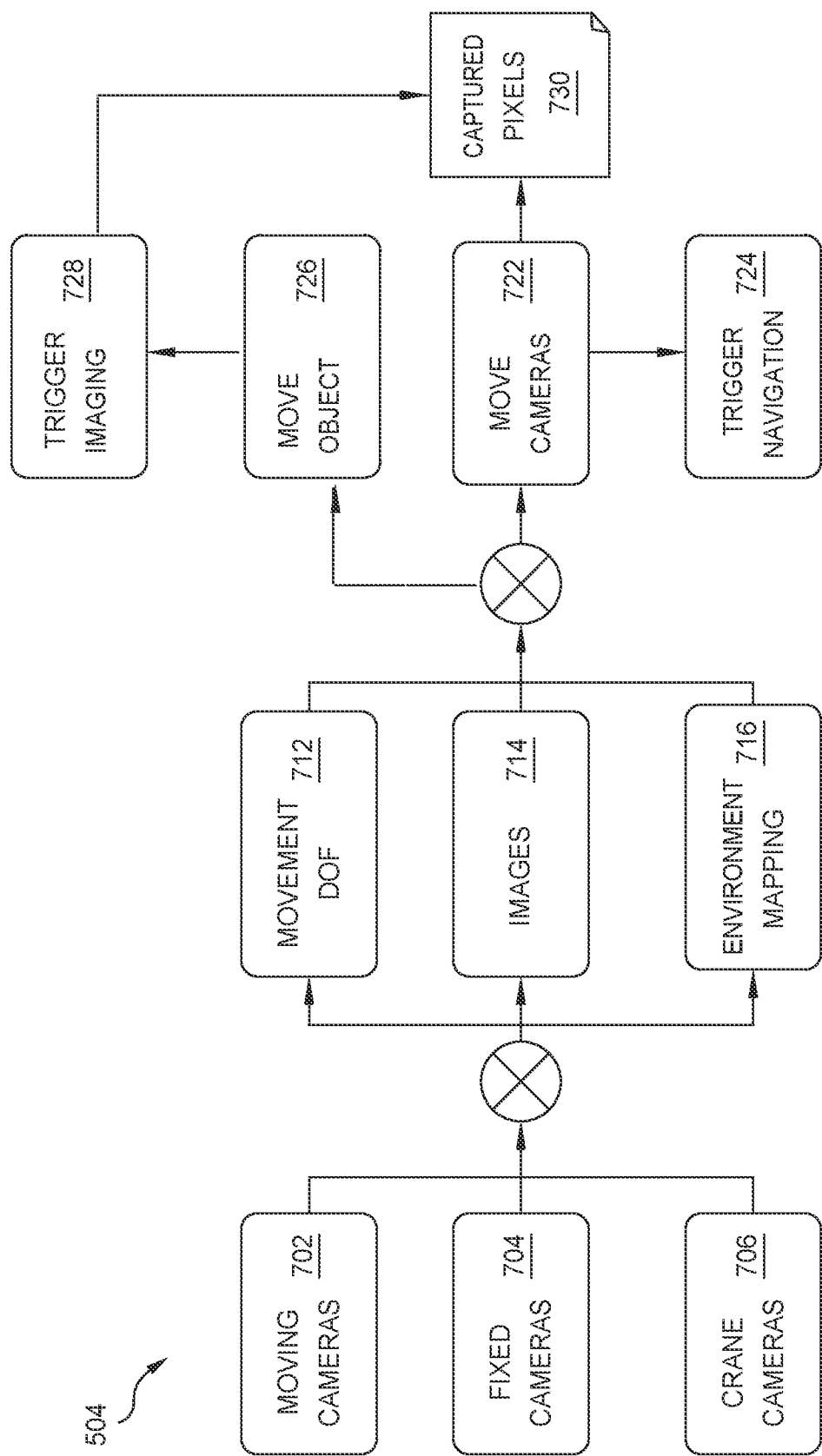
FIG. 7 is a flowchart illustrating acquiring an image for autonomous image acquisition for production and environment monitoring and event detection, according to one embodiment.

FIG. 7 is a flowchart illustrating acquiring an image for autonomous image acquisition for production and environment monitoring and event detection, according to one embodiment. In an embodiment, FIG. 7 corresponds with block 504 illustrated in FIG. 5. In an embodiment, an image acquisition service (e.g., the image acquisition service 214 illustrated in FIG. 2) merges together camera data and metadata describing the cameras.

For example, the image acquisition service can merge data identifying moving cameras 702 (e.g., AGV cameras 142, 144, 146, and 148 illustrated in FIG. 1), fixed cameras 704 (e.g., PTZ cameras 122 and 124 illustrated in FIG. 1), and crane cameras 706 (e.g., crane cameras 132 and 134 illustrated in FIG. 1). The image acquisition service can merge this data with metadata reflecting the movement DOF 712 (e.g., the DOF for movement of each of the categories of cameras) and images 714. For example, the movement DOF 712 can identify the moving cameras 702 as having 6 DOF, and the crane cameras 706 as having 5 DOF. As another example, the images 714 can include time stamped images of the environment (e.g., captured using the cameras 702, 704, and 706, over time).

Further, the image acquisition service can combine the camera data and metadata with environment mapping 716. For example, the image acquisition service can use the initial camera locations identified at block 604 illustrated in FIG. 6, and the network graph representation of objects in the environment generated at block 606 illustrated in FIG. 6.

At block 722, the image acquisition service uses any, or all, of the camera data (e.g., the moving cameras 702, fixed cameras 704, and crane cameras 706), the metadata (e.g., the movement DOF 712 and images 714), and the environment mapping 716 (e.g., the initial camera locations and network graph representation of objects in the environment) to determine how to move the cameras. For example, at block 724 the image acquisition service can trigger navigation of cameras (e.g., AGV cameras or crane cameras). As another example, the image acquisition service can trigger pan, tilt, and zoom of cameras (e.g., PTZ cameras and any other cameras with pan, tilt, zoom features). This is discussed further below, with regard to FIG. 8.

Further, in an embodiment, at block 726 the image acquisition service uses any, or all, of the camera data (e.g., the moving cameras 702, fixed cameras 704, and crane cameras 706), the metadata (e.g., the movement DOF 712 and images 714), and the environment mapping 716 (e.g., the initial camera locations and network graph representation of objects in the environment) to determine whether (and how) to move the object being recorded. For example, the image acquisition service can provide an alert or other suitable indication to move the object to provide for better image acquisition (e.g., to alert an administrator to move the object). As another example, the image acquisition service could trigger navigation of the object (e.g., automatic navigation of the object). In an embodiment, moving the object can be done instead of, or in addition to, moving the cameras at block 722. For example, the image acquisition service could identify that that object should be moved to an improved location for image acquisition, and the cameras should also be moved. At block 728, the image acquisition service can trigger imaging (e.g., of the object after it has moved).

In an embodiment, the image acquisition service uses the cameras to generate captured pixels 730. For example, the captured pixels 730 can be a flattened union of captured pixels across all cameras in the environment. The captured pixels 730 can be used to identify gaps in coverage by the cameras, presently and in the future. This is discussed further below with regard to FIG. 9.

Figure 8:
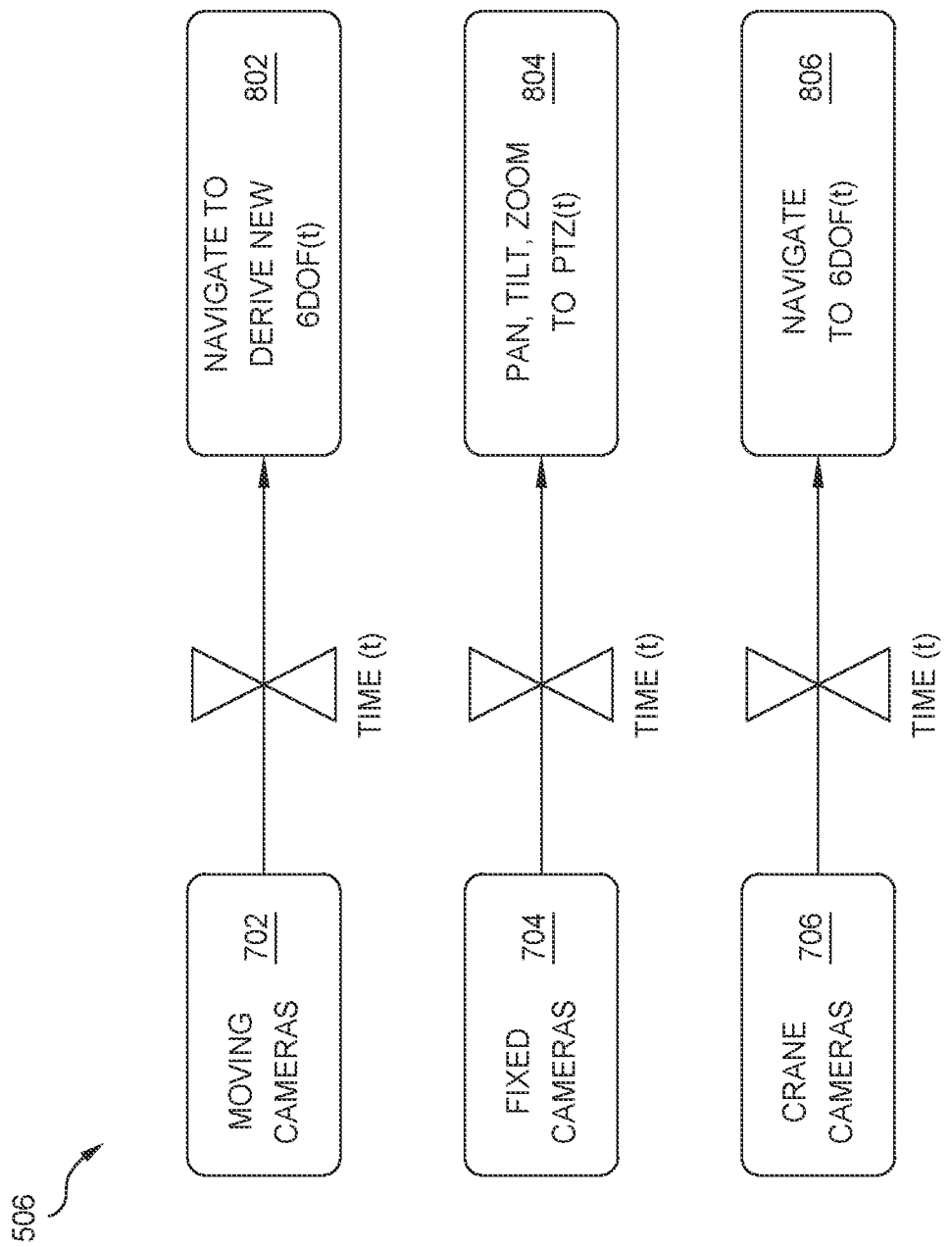
FIG. 8 is a flowchart illustrating controlling image capture device navigation for autonomous image acquisition for production and environment monitoring and event detection, according to one embodiment.

FIG. 8 is a flowchart illustrating controlling image capture device navigation for autonomous image acquisition for production and environment monitoring and event detection, according to one embodiment. In an embodiment, FIG. 8 corresponds with block 506 illustrated in FIG. 5. In an embodiment, a navigation service (e.g., the navigation service 216 illustrated in FIG. 2) controls moving cameras 702 (e.g., AGV cameras 142, 144, 146, and 148 illustrated in FIG. 1), fixed cameras 704 (e.g., PTZ cameras 122 and 124 illustrated in FIG. 1), and crane cameras 706 (e.g., crane cameras 132 and 134 illustrated in FIG. 1).

For example, at block 802 the navigation service can navigate the moving cameras 702 (e.g., one or more vehicles associated with the moving cameras 702) to derive a new 6 DOF for the cameras, over time. In an embodiment, this can include deriving a given cameras 6 DOF relative to a vehicle frame. This can be used as an extrinsic matrix, to define the relative spatial relationship between the vehicle frame (e.g., where the vehicle is in a given coordinate system, either absolute or relative) and the camera's position.

At block 804 the navigation service can navigate the fixed cameras 704 to pan, tilt, and zoom, over time. In an embodiment, this can include a full 3 DOF rotational control of the camera, including pitch, roll, and azimuth. At block 806 the navigation service can navigate the crane cameras 706 to 6 DOF, over time. In an embodiment, the crane offers 6 DOF of movement. Alternatively, or in addition, a crane may offer 5 DOF, or any other suitable movement.

As discussed below with regard to FIG. 9, in an embodiment a scan coverage service (e.g., the scan coverage service 218 illustrated in FIG. 2), an image acquisition service (e.g., the image acquisition service 214), a combination of both, or any other suitable software service, can generate routing and navigation paths for the cameras (e.g., real-time routing and navigation paths). For example, the scan coverage service (or other suitable service) can identify routes based on two primary objective functions and two secondary objective functions. The primary objective functions can be to maximize coverage of the target object (or objects), while minimizing the total number of cameras required to capture full views of the target object (or objects). For example, as discussed below, enclosing bounding boxes or semantically segmented regions representing flattened views of the cameras can be compared to 2D representations of the object (or objects), and can be used to identify coverage gaps.

In an embodiment, the scan coverage service (or other suitable service) can further identify routes based on two secondary objective functions. For example, a first secondary objective function can determine whether a target object is static over a defined time period, and can ignore image acquisition for that target object over that time period. In an embodiment, this avoids wasting resources attempting to repeatedly capture static objects (e.g., objects that are unchanging), freeing resources to be used to capture dynamic objects. As another example, another secondary objective could be to maximize situational awareness for all cameras (e.g., for a given timeframe). This can avoid collisions and reduce risk of collisions from moving cameras.

Figure 9:
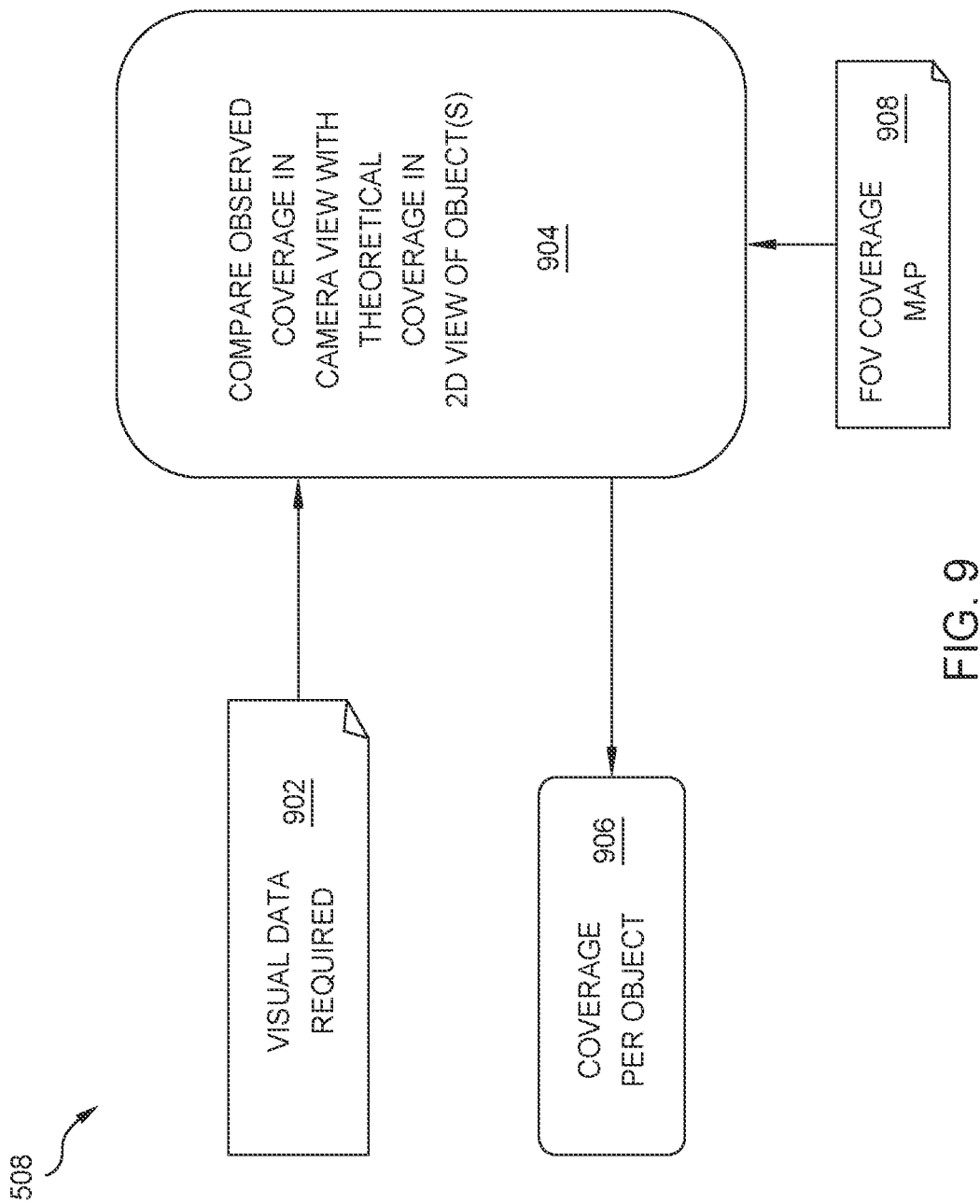
FIG. 9 is a flowchart illustrating calculating pixel coverage for autonomous image acquisition for production and environment monitoring and event detection, according to one embodiment.

FIG. 9 is a flowchart illustrating calculating pixel coverage for autonomous image acquisition for production and environment monitoring and event detection, according to one embodiment. In an embodiment, FIG. 9 corresponds with block 508 illustrated in FIG. 5. In an embodiment, at block 904 a scan coverage service (e.g., the scan coverage service 218 illustrated in FIG. 2) receives an event 902 expressing that visual data is required (e.g., for a target object or objects). For example, the event 902 can be a query to the scan coverage service for visual data describing the target object or objects.

At block 904, the scan coverage service compares observed coverage in a camera view with theoretical coverage in a 2D view of the target object(s). For example, the scan coverage service can calculate a union of pixels in camera view compared to pixels in a 2D view of the target object(s), using an FOV coverage map 908 (e.g., a pixel map), to generate coverage per object 906 (e.g., camera coverage per target object at a given moment in time). For example, the scan coverage service can calculate an intersection-over-union (IoU) for each camera two-dimensional image perspective (e.g., FOV), and can create a union of all IoUs for all cameras and the 2D view of the target object(s). In an embodiment, IoU describes a ratio of the overlapping area of ground truth and predicted area, to the total area (e.g., for pixel values). If the scan coverage service has captured every aspect (e.g., every side) of the target object(s), the IoU will be 1. In an embodiment, the FOV coverage map 908 is generated by a 3D processing service using bound boxes reflecting the coverage of the available cameras and a 2D representation of the target object(2). This is discussed further below with regard to FIGS. 10A-10B.

As discussed above with regard to FIG. 8, in an embodiment the scan coverage service (or another suitable software service) can use a number of primary and secondary objective functions to generate routing and navigation paths for the cameras (e.g., real-time routing and navigation paths). These can be expressed mathematically. For example, $loc_{ni}$ can represent the location of a camera i at a time n, using the coordinates $\{[x_{ni}, y_{ni}, z_{ni}]\}$. $IMC_{ni}$ can represent the image frames from moving cameras, where i∈m: total number of cameras, $IFC_{ni}$ can represent the image frames from fixed cameras, where i∈m: total number of cameras, and $ICC_{ni}$ can represent the image frames from crane cameras, where i∈m: total number of cameras. These expressions can be represented using the tuples $IMC_{ni}\{[6DOF], [FOV], [PTZ], [time\ Stamp]\}$, $IFC_{ni}\{[3DOF], [FOV], [time\ Stamp]\}$, and $ICC_{ni}\{[5DOF], [FOV], [time\ Stamp]\}$.

Constraints can be defined as follows. For each frame from camera (n) at time (i), there should be an image frame with the target object's enclosing bounding box or semantically segmented region visible, the union estimation of bounding boxes from all cameras at time (i) should be equal to the 2D view of the target object(s), the situational awareness (e.g., of the moving cameras) at time (i) must be greater than or equal to the situational awareness at time (i−1), and dynamic activity should be focus of the camera views. These constraints can be used for the objective functions, to maximize situational awareness at time (i) from all cameras, minimize the total number of cameras required to capture the full 2D view of the target object(s), ignore image acquisition while an object remains static during a defined time period, and maximize CovX=(union of bounding boxes of target object(s) captured from all cameras at time (i))/maximum bounding box of target object(s)).

In an embodiment, one or more of these techniques can be used to identify current gaps in coverage by cameras and to navigate (or move) cameras accordingly. Further, one or more of these techniques can be used to predict future gaps in coverage (e.g., based on movement trends for the target object(s), camera(s), or other objects in the environment. Cameras can be navigated, or moved, to avoid these future predicted gaps in coverage.

Figure 10A:
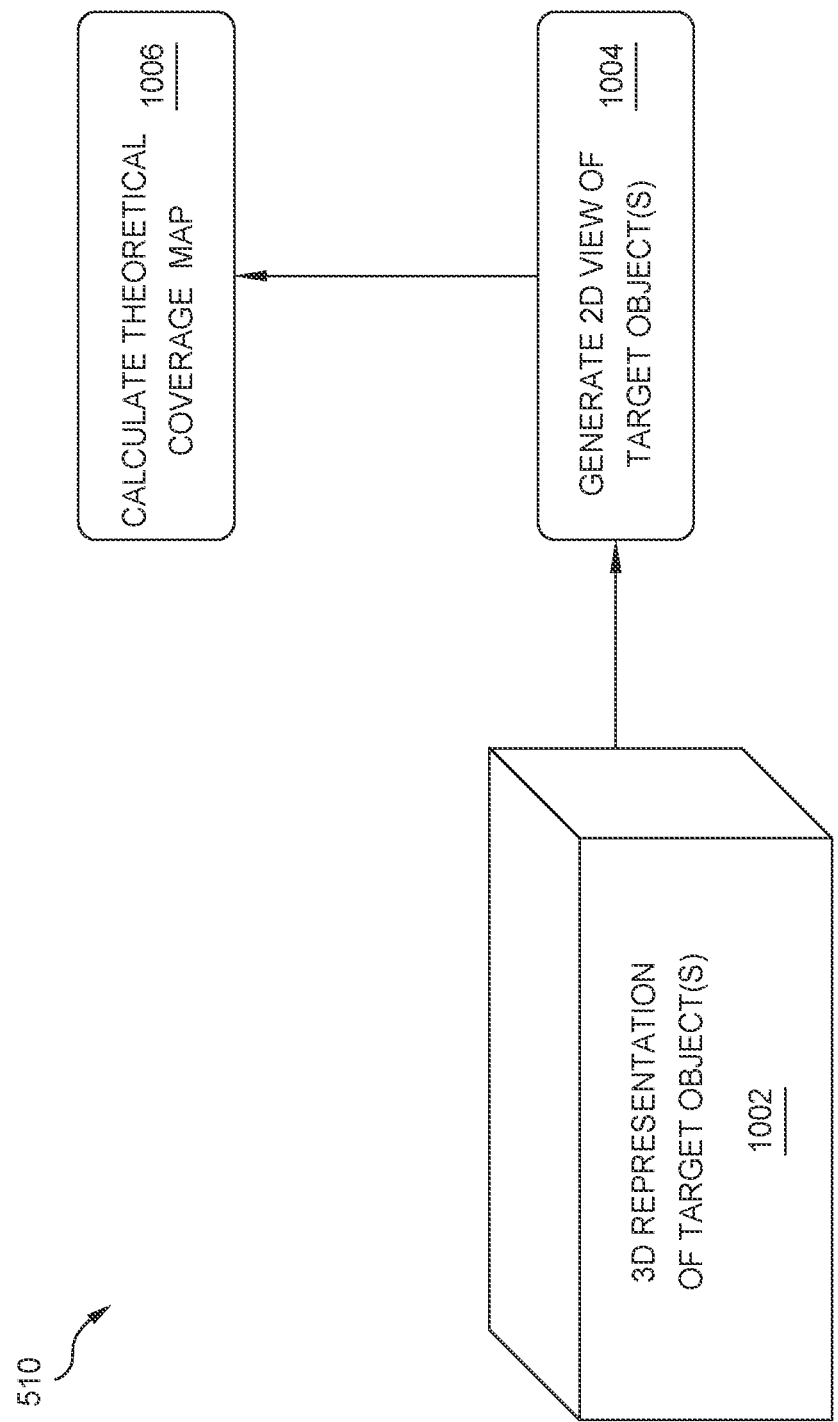
FIG. 10A is a flowchart illustrating processing three-dimensional images for autonomous image acquisition for production and environment monitoring and event detection, according to one embodiment.

FIG. 10A is a flowchart illustrating processing three-dimensional images for autonomous image acquisition for production and environment monitoring and event detection, according to one embodiment. In an embodiment, FIG. 10A corresponds with block 510 illustrated in FIG. 5. In an embodiment, at block 1004 a 3D processing service (e.g., the 3D processing service 220 illustrated in FIG. 2) generates a 2D view of the target object(s). For example, the target object (or objects) can be represented by 3D representations of target object(s) 1002 (e.g., 3D object model(s) 222 illustrated in FIG. 2). These can generated using any suitable source, including measurement of the object (e.g., using LIDAR or any other suitable technique), models of the object (e.g., using a suitable computer aided design (CAD) software), or using any other suitable technique.

At block 1004, the 3D processing service uses the 3D representation of the target objects(s) 1002 to generate a 2D view of the target object(s). For example, the 3D objects can be processed using suitable (CAD) tools. This can include using a 2D manifold chart to map from a manifold to a local coordinate system. For example, CATIA® Generative Shape Design (GSD) can be used. This is merely an example, and any suitable manifold chart and mapping, or other 2D conversion technique, can be used.

At block 1006, the 3D processing service calculates a theoretical coverage map (e.g., a FOV pixel map). For example, the 3D processing service can generate enclosing bounding boxes or semantically segmented regions representing the FOV of the various cameras, and can compare these bounding boxes to the 2D view of the target object(s). Each enclosing bounding box or semantically segmented region can represent the FOV for a given camera, portion of a camera, or combination of cameras, at a given time. The 3D processing service can calculate a union of the bounding boxes to identify whether all aspects (e.g., sides) of the target object(s) are covered by the cameras. This is discussed further below with regard to FIG. 10B.

FIG. 10B further illustrates processing three-dimensional images for autonomous image acquisition for production and environment monitoring and event detection, according to one embodiment. As discussed above with regard to FIG. 10A, a 3D processing service (e.g., the 3D processing service 220 illustrated in FIG. 2) generates a 2D view 1052 of a target object from a 3D model 1002 of the object.

In an embodiment, not all aspects (e.g., not all sides) of the target object need to be observed. For example, a target object may be resting on the ground, and the underside may be in contact with the ground and not needed for observation. In an embodiment, the 3D processing service generates a 2D view 1052 that excludes the area not needed for observation.

In an embodiment, the 3D processing service generates a number of enclosing bounding boxes or semantically segmented regions 1072A-E. Each bounding box 1072A-E represents the FOV for a given camera, of the target object. A union of the bounding boxes 1072A-E can be compared to the 2D view 1052 of the target object to identify gaps in coverage by the cameras. In an embodiment, cameras can be moved if a threshold amount, or percentage, of the target objects is not covered by the cameras or is predicted to not be covered by the cameras.

Figure 11:
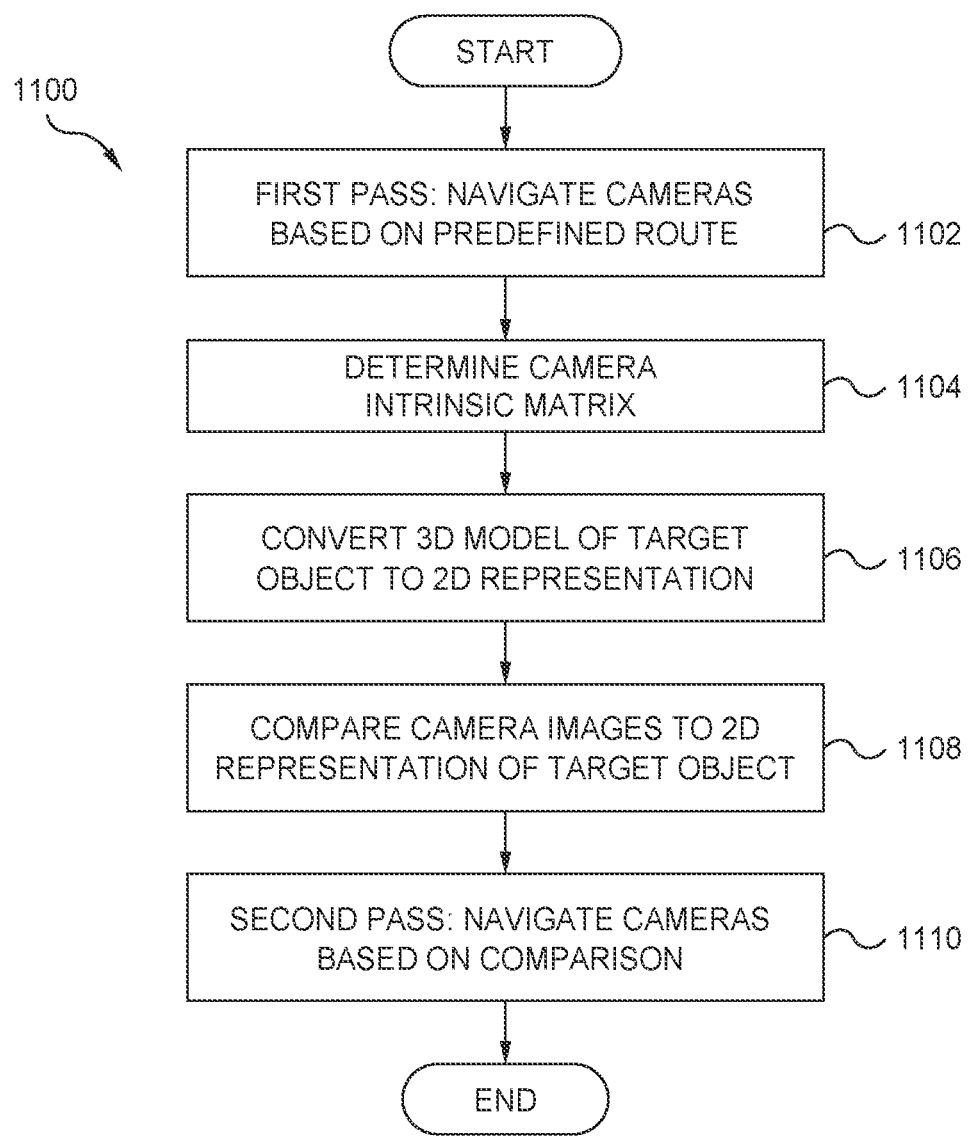
FIG. 11 is a flowchart further illustrating autonomous image acquisition for production and environment monitoring and event detection, according to one embodiment.

FIG. 11 is a flowchart 1100 further illustrating autonomous image acquisition for production and environment monitoring and event detection, according to one embodiment. At block 1102 an image acquisition service (e.g., the image acquisition service 214 illustrated in FIG. 2) takes a first pass and navigates cameras based on a predefined route. For example, the image acquisition service can use a predefined route designed to provide a minimum level of coverage of the target object(s). The image acquisition service can make a first pass along the predefined route, collecting image data.

At block 1104, the image acquisition determines the camera intrinsic matrix. For example, the image acquisition service can generate a map of captured pixels reflecting the FOVs of the cameras, over time. This is discussed above with regard to FIG. 7.

At block 1106, a 3D processing service (e.g., the 3D processing service 220 illustrated in FIG. 2) converts a 3D model of the target object(s) to a 2D representation. For example, the 3D processing service can generate a flattened 2D view of the target object(s) from a 3D model. This is discussed above with regard to FIG. 10A.

At block 1108, a scan coverage service (e.g., the scan coverage service 218 illustrated in FIG. 2) compares the camera images to the 2D representation of the target object. For example, the scan coverage service can generate enclosing bounding boxes or semantically segmented regions from the camera images and can compare the enclosing bounding boxes or semantically segmented regions to the 2D representation of the target object(s). This is discussed above with regard to FIG. 10B. In an embodiment, the scan coverage service can calculate an IoU for each camera image (e.g., illustrating the camera's FOV), and can create a union of all IoUs for all cameras and the 2D view of the target object(s). If the scan coverage service has captured every aspect (e.g., every side) of the target object(s), the IoU will be 1. This is discussed further above, with regard to FIG. 9. Further, in an embodiment, a target IoU can be defined using a threshold value. For example, an IoU less than 1, but meeting a threshold, can be sufficient where not every portion of an object must be visible. In an embodiment, the threshold can be pre-defined (e.g., by an administrator), configured dynamically (e.g., during operation), or determined automatically (e.g., using an ML model or another suitable technique).

At block 1110, a navigation service (e.g., the navigation service 216 illustrated in FIG. 2) takes a second pass and navigates the cameras based on the comparison. For example, the navigation service can navigate movable cameras (e.g., AGV cameras or crane cameras), or can pan, tilt, or zoom cameras, to cover any current or future coverage gaps identified at block 1106. In an embodiment, the navigation service can route (or move) the cameras based on a route generated by the scan coverage service (or another suitable service). This route can be generated based on one or more primary, or secondary, objective functions, as discussed above with regard to FIGS. 8-9.

Further, in an embodiment, the software services described above can iterate through blocks 1102-1110, until sufficient coverage is established. For example, after block 1110 the image acquisition service can determine whether a coverage threshold has been reached. This threshold can be pre-determined, determined dynamically during operation (e.g., using a suitable ML model or a software service), or determined in any other suitable manner. If the image acquisition service determines that the threshold has not been met, the flow returns to block 1102 with an updated pre-defined route (e.g., he image acquisition service navigates the cameras on an updated pre-defined route taking into account the route taken at block 1110). The flow then proceeds through block 1110, iterating as necessary. Once the image acquisition service determines that the coverage threshold has been met, the flow ends.

EXAMPLE CLAUSES

Implementation examples are described in the following numbered clauses:

Clause 1: A method, comprising: determining a plurality of two-dimensional image perspectives for a plurality of image capture devices, comparing the plurality of two-dimensional image perspectives with a generated two-dimensional representation of a target object, wherein the two-dimensional representation is generated based on a three-dimensional model of the target object, and automatically moving at least one of the plurality of image capture devices, based on the comparing, to increase a portion of the target object captured by the plurality of image capture devices.

Clause 2: The method of any of clauses 1 or 3-11, wherein the target object comprises an object undergoing manufacturing, and the plurality of image capture devices are configured to capture images to monitor the target object during manufacturing.

Clause 3 : The method of any of clauses 1-2 or 4-11, wherein the comparing the plurality of two-dimensional image perspectives with the generated two-dimensional representation of a target object comprises: generating a plurality of enclosing bounding boxes or semantically segmented regions, each of the bounding boxes corresponding with at least one of the plurality of two-dimensional image perspectives, and comparing the plurality of enclosing bounding boxes or semantically segmented regions with the two-dimensional representation of the target object.

Clause 4: The method of any of clauses 1-3 or 5-11, wherein the comparing the plurality of two-dimensional image perspectives with the generated two-dimensional representation of the target object further comprises: excluding a portion of the three-dimensional model of the target object from the comparing the plurality of enclosing bounding boxes or semantically segmented regions with the two-dimensional representation of the target object, and wherein the excluded portion is not captured by the plurality of image capture devices.

Clause 5: The method of any of clauses 1-4 or 6-11, wherein: the plurality of image capture devices comprises a first moveable camera, and automatically moving at least one of the plurality of image capture devices comprises navigating the first moveable camera to move relative to the target object.

Clause 6: The method of any of clauses 1-5 or 7-11, wherein the first moveable camera comprises at least one of: an automated guided vehicle (AGV) mounted camera; or a crane-mounted camera.

Clause 7: The method of any of clauses 1-6 or 8-11, wherein the automatically moving at least one of the plurality of image capture devices, based on the comparing, to increase the portion of the target object captured by the plurality of image capture devices, comprises: generating a movement plan for the first moveable camera to increase coverage of the target object by the plurality of image capture devices, while reducing a total number of image capture devices required to capture the target object.

Clause 8: The method of any of clauses 1-7 or 9-11, wherein the movement plan is further generated to increase coverage of relevant objects by the first moveable camera, relative to prior to the movement plan.

Clause 9: The method of any of clauses 1-8 or 10-11, wherein the method further includes identifying at least a portion of the target object as static during a first time period, wherein the movement plan is further generated to omit capturing images of the portion of the target object during the first time period.

Clause 10: The method of any of clauses 1-9, or 11 wherein the method further includes generating a network graph reflecting an environment for the target object, wherein the network graph comprises a node representing the target object and a plurality of edges representing distances from the target object to a plurality of other objects in the environment represented as respective nodes in the network graph.

Clause 11: The method of any of clauses 1-10, wherein the method further includes: identifying one or more static objects in the environment and one or more dynamic objects in the environment, using a deep neural network (DNN)

Clause 12: A system, comprising: a computer processor, and a memory having instructions stored thereon which, when executed on the computer processor, performs a method in accordance with any one of Clauses 1-11.

Clause 13: A non-transitory computer-readable medium containing computer program code that, when executed by operation of one or more computer processors, performs a method in accordance with any one of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    determining a plurality of two-dimensional image perspectives for a plurality of image capture devices, wherein one or more of the plurality of image capture devices is moveable relative to other image capture devices of the plurality of image capture devices;
    generating a two-dimensional representation of a target object based on a three-dimensional model of the target object;
    comparing the plurality of two-dimensional image perspectives with the two-dimensional representation of the target object to generate a coverage map indicating a number of pixels of the plurality of the two-dimensional image perspectives that correspond to the target object in the two-dimensional representation of the target object;
    automatically moving at least one of the plurality of image capture devices relative to the other image capture devices of the plurality of image capture devices to increase the number of pixels of the plurality of the two-dimensional image perspectives that correspond to the target object included in the coverage map; and
    capturing a plurality of images of the target object with the plurality of image capture devices based on automatically moving the at least one of the plurality of image capture devices relative to the other image capture devices.

2. The method of claim 1, wherein:
    the target object comprises an object undergoing manufacturing, and
    the plurality of image capture devices are configured to capture images to monitor the target object during manufacturing.

3. The method of claim 1, wherein the comparing the plurality of two-dimensional image perspectives with the generated two-dimensional representation of a target object comprises:
    generating a plurality of enclosing bounding boxes or semantically segmented regions, each of the bounding boxes or semantically segmented regions corresponding with at least one of the plurality of two-dimensional image perspectives; and
    comparing the plurality of enclosing bounding boxes or semantically segmented regions with the two-dimensional representation of the target object to generate the coverage map.

4. The method of claim 3, wherein the comparing the plurality of two-dimensional image perspectives with the generated two-dimensional representation of the target object further comprises:
    excluding a portion of the three-dimensional model of the target object from the comparing the plurality of enclosing bounding boxes or semantically segmented regions with the two-dimensional representation of the target object, wherein the excluded portion is not captured by the plurality of image capture devices.

5. The method of claim 1, wherein the at least one of the plurality of image capture devices comprises an automated guided vehicle (AVG) mounted camera.

6. The method of claim 1, wherein the at least one of the plurality of image capture devices comprises a crane-mounted camera.

7. The method of claim 1, wherein the automatically moving the at least one of the plurality of image capture devices is performed to and to reduce image overlap between the plurality of two-dimensional image perspectives.

8. The method of claim 1, wherein the automatically moving the at least one of the plurality of image capture devices is performed to avoid collisions between image capture devices of the plurality of image capture devices.

9. The method of claim 1, further comprising:
identifying at least a portion of the target object as static during a first time period,
wherein the at least one of the plurality of image capture device is automatically moved to omit capturing images of the portion of the target object during the first time period.

10. The method of claim 1, further comprising:
generating a network graph reflecting an environment for the target object,
wherein the network graph comprises a node representing the target object and a plurality of edges representing distances from the target object to a plurality of other objects in the environment represented as respective nodes in the network graph.

11. The method of claim 10, further comprising: identifying one or more static objects in the environment and one or more dynamic objects in the environment, using a deep neural network (DNN).

12. A non-transitory computer-readable medium containing computer program code that, when executed by operation of one or more computer processors, performs operations comprising:
determining a plurality of two-dimensional image perspectives for a plurality of image capture devices, wherein one or more of the plurality of image capture devices is moveable relative to other image capture devices of the plurality of image capture devices;
generating a two-dimensional representation of a target object based on a three-dimensional model of the target object;
comparing the plurality of two-dimensional image perspectives with the two-dimensional representation of the target object to generate a coverage map indicating a number of pixels of the plurality of the two-dimensional image perspectives that correspond to the target object in the two-dimensional representation of the target object;
automatically moving at least one of the plurality of image capture devices relative to the other image capture devices of the plurality of image capture devices, to increase the number of pixels of the plurality of the two-dimensional image perspectives that correspond to the target object; and
capturing a plurality of images of the target object with the plurality of image capture devices based on automatically moving the at least one of the plurality of image capture devices relative to the other image capture devices.

13. The non-transitory computer-readable medium of claim 12, wherein:
the target object comprises an object undergoing manufacturing, and
the plurality of image capture devices are configured to capture images to monitor the target object during manufacturing.

14. The non-transitory computer-readable medium of claim 12, wherein the comparing the plurality of two-dimensional image perspectives with the generated two-dimensional representation of the target object comprises:
generating a plurality of enclosing bounding boxes or semantically segmented regions, each of the bounding boxes or semantically segmented regions corresponding with at least one of the plurality of two-dimensional image perspectives; and
comparing the plurality of enclosing bounding boxes or semantically segmented regions with the two-dimensional representation of the target object to generate the coverage map.

15. The non-transitory computer-readable medium of claim 14, wherein the comparing the plurality of two-dimensional image perspectives with the generated two-dimensional representation of a target object further comprises:
excluding a portion of the three-dimensional model of the target object from the comparing the plurality of enclosing bounding boxes or semantically segmented regions with the two-dimensional representation of the target object,
wherein the excluded portion is not captured by the plurality of image capture devices.

16. The non-transitory computer-readable medium of claim 12, wherein the at least one of the plurality of image capture devices comprises an automated guided vehicle (AVG) mounted camera or a crane-mounted camera.

17. A system, comprising:
a computer processor; and
a memory having instructions stored thereon which, when executed on the computer processor, performs operations comprising:
determining a plurality of two-dimensional image perspectives for a plurality of image capture devices, wherein one or more of the plurality of image capture devices is moveable relative to other image capture devices of the plurality of image capture devices;
generating a two-dimensional representation of a target object based on a three-dimensional model of the target object;
comparing the plurality of two-dimensional image perspectives with the two-dimensional representation of the target object to generate a coverage map indicating a number of pixels of the plurality of the two-dimensional image perspectives that correspond to the target object in the two-dimensional representation of the target object; and
automatically moving at least one of the plurality of image capture devices relative to the other image capture devices of the plurality of image capture devices, based on the comparing, to increase the number of pixels of the plurality of the two-dimensional image perspectives that correspond to the target object; and capturing a plurality of images of the target object with the plurality of image capture devices based on automatically moving the at least one of the plurality of image capture devices relative to the other image capture devices.

18. The system of claim 17, wherein:
the target object comprises an object undergoing manufacturing, and
the plurality of image capture devices are configured to capture images to monitor the target object during manufacturing.

19. The system of claim 17, wherein the comparing the plurality of two-dimensional image perspectives with the generated two-dimensional representation of a target object comprises:
generating a plurality of enclosing bounding boxes or semantically segmented regions, each of the bounding boxes or semantically segmented regions corresponding with at least one of the plurality of two-dimensional image perspectives; and
comparing the plurality of enclosing bounding boxes or semantically segmented regions with the two-dimensional representation of the target object to generate the coverage map.

20. The system of claim 17, wherein the at least one of the plurality of image capture devices comprises an automated guided vehicle (AVG) mounted camera or a crane-mounted camera.

* * * * *